No. 639,371. Patented Dec. 19, 1899.
P. GAUTIER.
MACHINE FOR FORMING OPTICAL SURFACES.
(Application filed Apr. 4, 1899.)
(No Model.) 2 Sheets—Sheet 1.

WITNESSES:
Ella L. Giles
Otrmmnk

INVENTOR
Paul Gautier
BY
Richardr
ATTORNEYS

UNITED STATES PATENT OFFICE.

PAUL GAUTIER, OF PARIS, FRANCE.

MACHINE FOR FORMING OPTICAL SURFACES.

SPECIFICATION forming part of Letters Patent No. 639,371, dated December 19, 1899.

Application filed April 4, 1899. Serial No. 711,734. (No model.)

*To all whom it may concern:*

Be it known that I, PAUL GAUTIER, a citizen of the Republic of France, and a resident of Paris, France, have invented certain new and useful Improvements in Grinding and Polishing Machines, of which the following is a specification.

This invention relates to a machine for mechanically forming optical surfaces of great precision.

The machine is represented in the accompanying drawings, in which—

Figure 1:
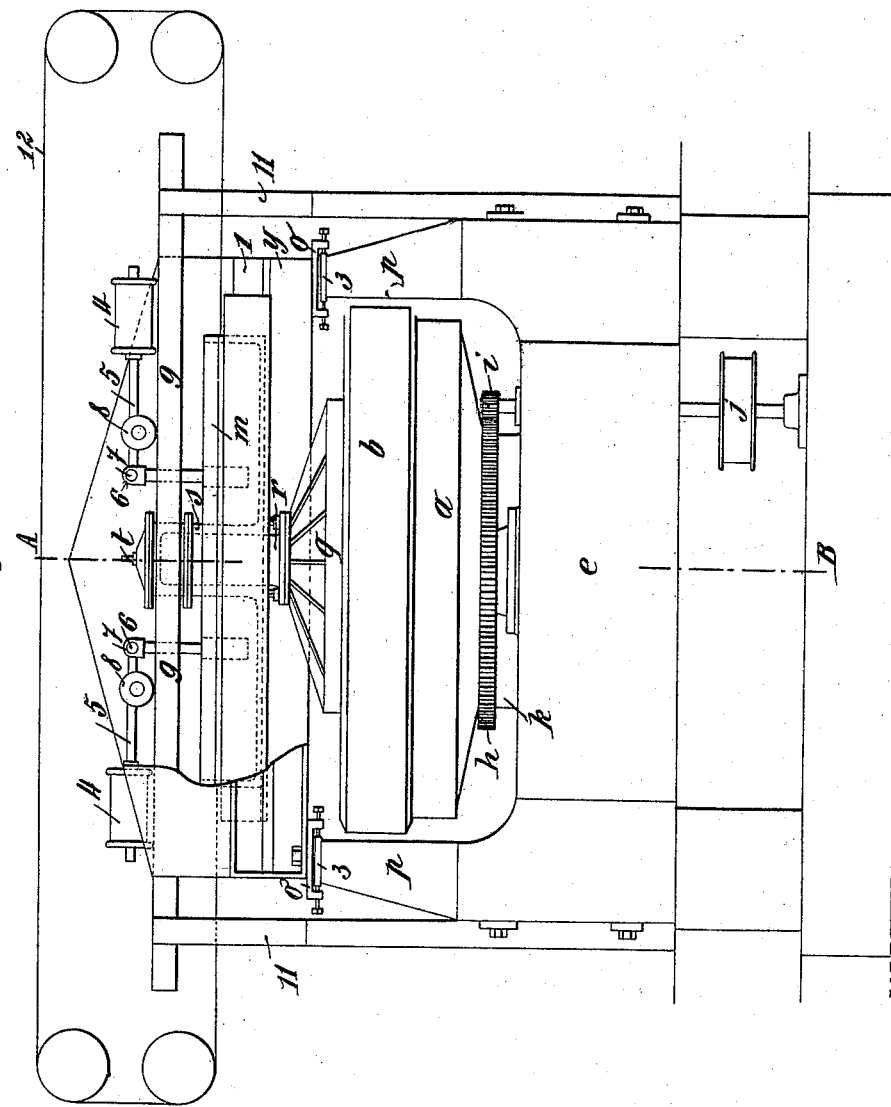
Figure 2:
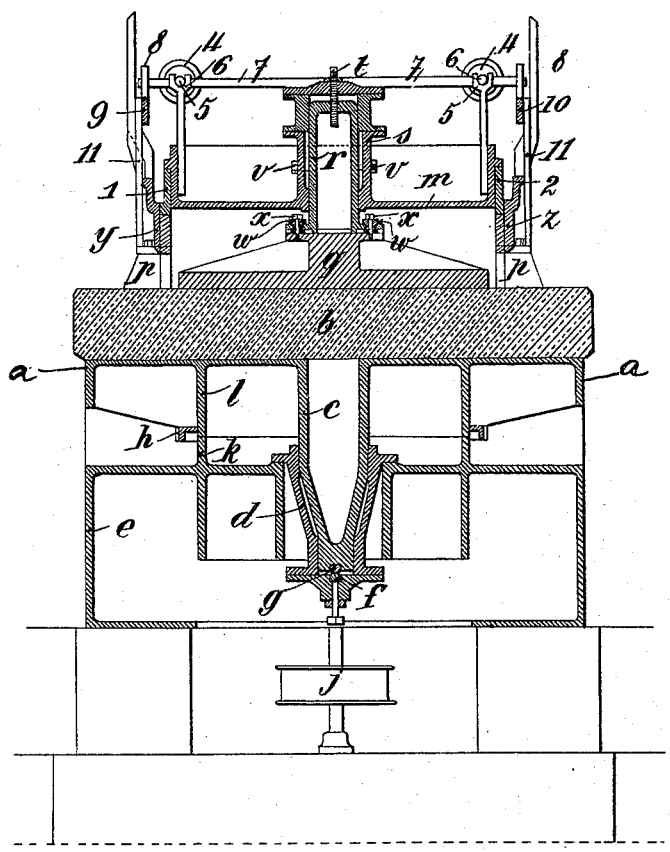

Figure 1 is a front elevation of the machine, and Fig. 2 is a cross-section taken on line A A of Fig. 1.

This machine, as represented in the drawings, comprises a circular plate $a$, upon which the object or optical part $b$ to be treated is placed. This plate is provided with a pivot $c$, adjusted in a socket $d$, suitably fitted to the base $e$ of the machine and at the lower portion of which is arranged a steel bead $f$, upon which bears a similar bead $g$, with which the pivot $c$ is provided. A toothed crown or gear $h$ is fixed upon or formed in one with the plate $a$. This toothed crown gears with a pinion $i$, rigidly fixed upon a vertical shaft, to which a rotary movement is imparted by means of a driving-pulley $j$ or in any other suitable manner. This arrangement serves to impart to the plate $a$, and consequently to the optical part $b$, mounted thereon, a continuous movement of rotation. It should be noticed that perfect equilibrium of the rotating plate $a$ is obtained by means of a circular path $k$, rigidly fixed to the base $e$ and upon which rests a corresponding circular rib $l$ of the said plate. Above this plate is arranged a cross-piece $m$, which is supported in a special manner by longitudinal beams $o$ $o$, fixed upon uprights $p$, rigidly fixed to the base $e$. This cross-piece $m$ supports a polishing-plate $q$, intended to act upon the optical part $b$ which is to be worked, this plate being provided with a pivot $r$, engaging in a socket $s$, rigidly attached to the cross-piece $m$. The pivot is suspended in this socket by means of a screw $t$ and maintained therein by means of set-screws $v$. Connection between the polishing-plate $q$ and its pivot $r$ is obtained by means of wedging-screws $w$, screwed into a flange of the said pivot and traversed by screws $x$, which are screwed into the said polishing-plate. This connection enables the operative surface of the polishing-plate to be caused to occupy a plane which is strictly parallel with that of the plate $a$, supporting the optical part which is being worked.

The cross-piece $m$ is supported by the longitudinal beams by means of slide-blocks, of which 1 and 2 are fixed to the cross-piece and $y$ $z$ to the longitudinal beams. The slide-blocks 1 and 2 rest upon the slide-blocks $y$ $z$, on which they are able to slide freely. The contact-surfaces of these slide-blocks are shaped to conform to the shape which it is desired to impart to the surface to be formed or ground.

The cross-piece $m$ and the polishing-plate which it carries are partially balanced by means of counterweights 4, which are respectively passed upon rods 5, pivoted to the extremity of supports 6, which are bolted to the said cross-piece. These rods 5 are arranged in such a manner as to oscillate in pairs upon two spindles 7, the extremities of which are provided with rollers 8, traveling upon rails 9 10, which are supported upon each side of the machine by uprights 11. Finally, the cross-piece $m$ is connected with a cable 12, to which an alternating movement may be imparted, which is integrally transmitted to the said cross-piece. In this movement the cross-piece is controlled by the slides $y$ $z$ and 1 2, which are in reality gages adapted to the surface which is to be worked or formed by the polishing-plate, which participates in all the movements of this cross-piece. Now if it is considered that the optical part which is being operated upon is itself displaced with a continuous movement of rotation it will at once be apparent that the surface formed will be plane, concave, or convex, according to the form of the slide-gages. These slides are movable in such a manner that they may be readily removed from the apparatus and replaced by others adapted to the form of the optical part which it is desired to produce.

It will of course be understood that the machine which has been described may be made in any size and that the forms and dimensions of its constituent parts may likewise vary.

What I claim is—

1. In combination, the rotatable base-plate with means for operating the same, the sliding cross-piece with means for operating the same, counterbalances for said piece, and a polishing-plate supported by said cross-piece, substantially as described.

2. In combination, the rotary base-plate, the horizontally-disposed sliding cross-piece having a central aperture, a pivot or trunnion adjustably mounted therein and a polishing-plate adjustably secured to the lower end of said trunnion, substantially as described.

3. In combination, the frame, the base-plate for supporting the article to be worked, the guide-bars $y\ z$ supported by said frame, the cross-piece having bars 1 2 bearing on said bars $y\ z$, means for reciprocating said cross-piece and the polishing-plate carried by said cross-piece, substantially as described.

4. In combination, the frame having a central bearing, the base-plate having a trunnion rotatably mounted in said bearing, the guiding-track $k$ for steadying said base-plate, means for rotating the base-plate, a polishing-plate suspended above said base-plate and means for reciprocating said polishing-plate, substantially as described.

In witness whereof I have hereunto set my hand in presence of two witnesses.

PAUL GAUTIER.

Witnesses:
 LÉON FRANCKEN,
 EDWARD P. MACLEAN.